United States Patent Office 3,513,089
Patented May 19, 1970

3,513,089
HYDROCARBON SEPARATION BY
ADSORPTION ON GRAPHITE
Charles John Geach, Shepperton, and Aleksander Jerzy Groszek, London, England, assignors to The British Petroleum Company Limited, London, England, a corporation of England
Filed Apr. 24, 1968, Ser. No. 723,829
Claims priority, application Great Britain, May 2, 1967, 20,166/67
Int. Cl. C07c 7/12; C10g 25/00
U.S. Cl. 208—310                                  17 Claims

ABSTRACT OF THE DISCLOSURE

A process as disclosed in which an aromatic hydrocarbon and/or a $C_4$ and higher normal paraffin hydrocarbon containing mixture is contacted with a graphite having a surface area of at least 50 m.$^2$/gm. at 50° C. to 200° C. in the presence of a liquid in which the hydrocarbons are soluble, so that the hydrocarbons are adsorbed removing unadsorbed material and desorbing the adsorbed components with a liquid in which they are soluble, at a temperature of 50° C. to 400° C. and finally recovering the adsorbed components from the desorbate.

Figure 1:
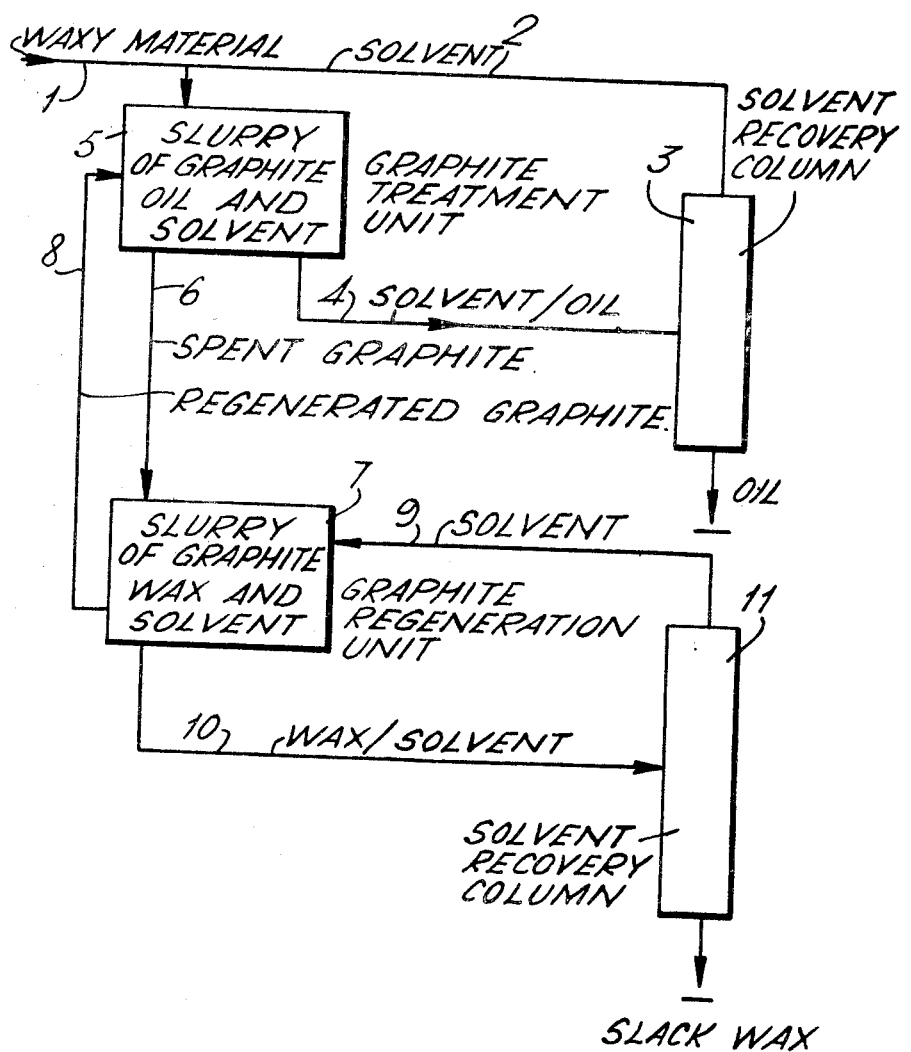

A further development is that in which a petroleum fraction containing aromatics and $C_4$ or/and higher n-paraffins is mixed with liquid and contacted with a slurry of graphite in the liquid, the slurry is washed with further liquid and desorption takes place in two stages, both using the same liquid as in adsorption. Both of the desorption stages takes place at elevated temperature.

Preferably the second process is a continuous flow counter-current process in which the graphite slurry flows counter-currently to the feed/liquid.

Preferably in the first process the liquids used in adsorption and desorption are the same.

---

This invention relates to the separation of aromatic and/or normal paraffin hydrocarbons from their mixtures with other hydrocarbons using graphite as a selective sorbent, and in particular to the production of lubricating oil base-stocks by graphite refining.

It is known that long chain normal paraffin hydrocarbons can be selectively adsorbed on high surface area graphites and that petroleum fractions, for example may be dewaxed and their cloud- and pour-points lowered. We have now found preferred desorption conditions for n-paraffin desorption from the graphite and also that both normal paraffin and aromatic hydrocarbons may be separated from mixtures containing them, and in particular that the pour-point of a suitable petroleum fraction may be lowered and/or the viscosity index increased by contacting the fraction as the feedstock with a finely divided graphite.

The invention accordingly consists in a process for the separation of aromatic and/or n-paraffin hydrocarbons from mixtures containing them which comprises contacting a mixture comprising at least one component selected from aromatic hydrocarbons and normal paraffin hydrocarbons having at least 4 carbon atoms per molecule with a graphite having a surface area of at least 50 m.$^2$/gm. at a temperature of from −50° C. to 200° C. and in the presence of a liquid in which the said component is soluble at the said temperature, removing unadsorbed material from the graphite, contacting the graphite at a temperature of from 50° C. to 400° C. with a liquid in which the said component is soluble at the said temperature, so as to desorb the adsorbed component from the graphite, and recovering the desorbed component from the liquid.

More particularly the invention consists in a process for the separation of aromatic and n-paraffin hydrocarbons from a petroleum fraction in which a petroleum fraction containing aromatic hydrocarbons and normal paraffin hydrocarbons having at least 4 carbon atoms per molecule is mixed with a liquid in which the aromatic and normal paraffin hydrocarbons are soluble, the mixture is contacted with a slurry of graphite having a surface area of at least 50 m.$^2$/gm. in the said liquid at a temperature of from −50° to 200° C., the slurry is washed with further liquid at a temperature of from −50 to 200° C., and at substantially the same temperature as that at which the mixture is contacted with the slurry, so as to separate unadsorbed material from the graphite, and the adsorbed components are desorbed from the graphite in two stages by contacting the slurry thereof in the liquid with further liquid, the first desorption being carried out at a temperature of from +20 to 270° C. and the second desorption being carried out at a higher temperature than that of the first desorption and from 100 to 400° C.

Most particularly the process is carried out as a multistage type of operation and preferably by a continuous flow technique. Counter-current operation is most preferred, in which a feed/liquid stream is contacted counter-currently with a graphite slurry, followed by a counter-current washing step with fresh liquid. The washed graphite slurry then proceeds to desorption counter-currently with fresh liquid.

Free or assisted settling followed by washing may be used in the various stages. Assisted settling is preferred and any of the commercially available devices, for example a centrifugal contactor/separator, or a hydrocyclone, may be used. Solvent may be recovered from both the adsorbed material and the desorbate and re-used.

Desirably liquid usage should be at a minimum, and in the case of a slurry process this is set by the minimum amount of liquid that will enable the graphite slurry to be pumped. We have found that this requires a liquid to graphite ratio of at least 1:1 weight/weight. In this type of process, using a counter-current method, the ratio of liquid overflow from the contacting vessel to the liquid underflow may be greater than 1:1 weight:weight, and preferably greater than 1.5:1. Moreover, the liquid to graphite ratio in the underflow should desirably be a minimum.

The feed mixture to the processes of the invention is preferably a petroleum fraction boiling above 30° C. and particularly a fraction in the waxy distillate boiling range, i.e. 300 to 700° C. The feed may be a straight-run fraction or a fraction which has been solvent-treated, provided that in the case of the second-mentioned process above such treatment has not made it free from aromatic hydrocarbons. Feeds to the first-mentioned process may include waxy raffinates obtained from such waxy distillates after a selective solvent treatment with e.g. furfural to remove aromatics. The processes of the invention are thus especially suitable for dewaxing distillate lubricating oil fractions and in particular for the preparation of lubricating oil base stocks having high voscosity indices, i.e. above +110, and low pour-points.

The graphite used should preferably have a surface area within the range 50–1200 m.$^2$/gm., particularly 300–1200 m.$^2$/gm., since the amount of adsorption increases with increase in the surface area of the graphite. The surface area may be increased by grinding and this may be carried out in air or vacuum or in an organic liquid, using a ball mill or a fluid energy mill. Graphites prepared by grinding in an organic liquid and suitable for use in the processes of the invention are described and claimed in South African Pat. No. 66/5,553. It has been found in the case of ground graphites that the nature of environment in which grinding has been carried out affects the relative extents to which the graphite adsorbs compounds having varying polarities, and also the surface area obtained by grinding for a specified time. The graphite used in a particular case will accordingly depend on the nature of the feedstock and the components to be separated therefrom.

The selectivity of a graphite for the adsorption of n-paraffins and aromatics may be measured by the heat of adsorption by the graphite of n-dotriacontane from a solution in n-heptane and by the heat of adsorption by the graphite of n-butanol from a solution in n-heptane. Graphites having selectivity for n-paraffins are defined as having a heat of adsorption of n-dotriacontane at 20° C. of not less than 1.5 cals./gm. of graphite.

Graphites having selectivity for aromatic hydrocarbons are defined as having a heat of adsorption of n-butanol at 20° C. of not less than 2 cals./gm. graphite.

The liquid in the presence of which adsorption on the graphite takes place may be a single paraffin hydrocarbn such as n-heptane or iso-octane, or a mixture of hydrocarbons may be used. The mixture may be synthetic or a refinery stream such as primary flash distillate (P.F.D.) or a light gasoline may be used. Alternatively, or additionally an alcoholic, aromatic or ketonic liquid may be used, and this may comprise one or more compounds. The choice of liquid together with the temperatures of adsorption and desorption will determine the nature and extent of separation of paraffinic and aromatic compounds from the feedstock. Non-polar compounds such as n-paraffin hydrocarbon promote the adsorption of aromatics whereas polar liquids such as alcohols promote the adsorption of non-polar compounds such as waxes. Aromatic liquids reduce the adsorption of aromaticcs and polar compounds. The converse effects are shown in desorptin, for example, aromatic liquids promote the desorption of aromatics. The liquid vehicle should be low-boiling i.e. its maximum boiling point should not be greater than 100° C. Hydrocarbons whose atmospheric boiling point is greater than this may be used at sufficient pressure to achieve a boiling point below the provided that the operating temperaturer is not greater than the critical temperature. Thus, for example, liquified propane and butane may be used under certain conditions.

The liquid used in desorption is preferably the same as that used in the adsorption step of the invention, particularly when a co- or counter-current contacting method is used. Alternatively a different liquid may be used.

It is possible not only to use a different liquid in adsorption from that used in desorption but also to use different liquids in separate desorption steps. Thus, for example, waxes and aromatics may be adsorbed and the aromatics separately desorbed by the use of an aromatic liquid such as benzene or toluene, or a ketone.

Operating conditions may be chosen from the following ranges

Adsorption:
  Contacting time, 1 min.–24 hrs.—preferably 2 mins.–30 mins.
  Liquid:feed ratio, 5:1–100:1—preferably 5:1–20:1
  Additional liquid wash:feed ratio, 1:1–100:1—preferably 2:1–5:1
  Graphite:feed ratio, 0.25:1–100:1—preferably 1:1–5:1
  Pressure, 0.1–1000 p.s.i.a.—preferably 10–200 p.s.i.a.
  Preferred temperaure, 0–40° C.
  Liquid flowrate, 0.1–5.0 litres/hr./preferably 0.1–1 litres/hr./1000 gms. graphite—1000 gms. graphite Desorption:
  Contacting time, 1 min.–24 hrs.—preferably 2 mins.–30 mins.
  Liquid:desorbate ratio, 5:1–100:1—preferably 5:1–20:1
  Graphite:desorbate ratio, 0.25:1–100:1—preferably 0.5:1–5:1
  Pressure, 10–10,000 p.s.i.a.—preferably 10–1000 p.s.i.a.
  Preferred temperature, 100–400° C.

The overall liquid feed ratio may be from 5:1 to 100:1 and preferably from 5:1 to 20:1.

In the process wherein desorption is carried out in two stages desorption conditions may be chosen from the following ranges:

1st desorption:
  Preferred temperatures, 40–125° C.
  Pressure, 10–10,000 p.s.i.a.—preferably 10–1000 p.s.i.a
  Liquid:desorbate ratio, 5:1–100:1—preferably 5:1–20:1
  Contacting time, 1 min.–24 hrs.—preferably min.–30 min.
  Graphite:desorbate ratio 0.25:1–100:1—preferably 0.5:1–5:1

2nd desorption:
  Preferred temperature, 150–400° C.
  Pressure, 10–10,000 p.s.i.a.—preferably 10–1000 p.s.i.a.
  Liquid:desorbate ratio, 5:1–100:1—preferably 5:1–20:1
  Contacting time, 1 min.–24 hrs.—preferably 2 min.–30 min.
  Graphite:desorbate ratio, 0.25:1–100:1—preferably 0.5:1–5:1

The adsorption of normal paraffins is promoted by low temperatures within the range stated and the proportion of aromatics in the total amount adsorbed increases as the temperature increases within the range stated. The effect is similar irrespective of whether the liquid used is aromatic or paraffinic. In the case of desportion aromatic liquids can desorb normal paraffins and aromatic hydrocarbons more readily than can paraffinic liquids at elevated temperatures, so that in this casee as the temperature is increased materials other than aromatics are desorbed, e.g. normal paraffins. The pressures at which adsorption and desorption are carried out will be such as to maintain the liquid used in the adsorption step and the desorbent in the liquid state and will be determined by the vapour pressures of these materials at the temperatures of adsorption and desorption. The loading of the graphite will affect the yield and the extent of adsorption and desorption. Thus, a low loading will give a low yield of adsorbed material but greater adsorption of waxes and aromatic hydrocarbons. A high loading will increase the yield but decrease the extent of removal of waxes and aromatic hydrocarbons from the feedstock, so that the four-point of the unadsorbed product will increase with loading whereas the viscosity index will increase.

In the event that a cyclic fixed bed type of operation is used this may comprise percolating the feed through a bed of graphite together with the liquid vehicle, removing non-adsorbed feed and liquid from the bed, stripping the liquid from the non-adsorbed feed material, desorbing the adsorbed material from the graphite with the liquid, removing the desorbed material and liquid from the desorbed material and re-contacting the graphite with the feed mixture.

Three embodiments of the processes of the invention are illustrated in the drawings, in which—

Figure 2:
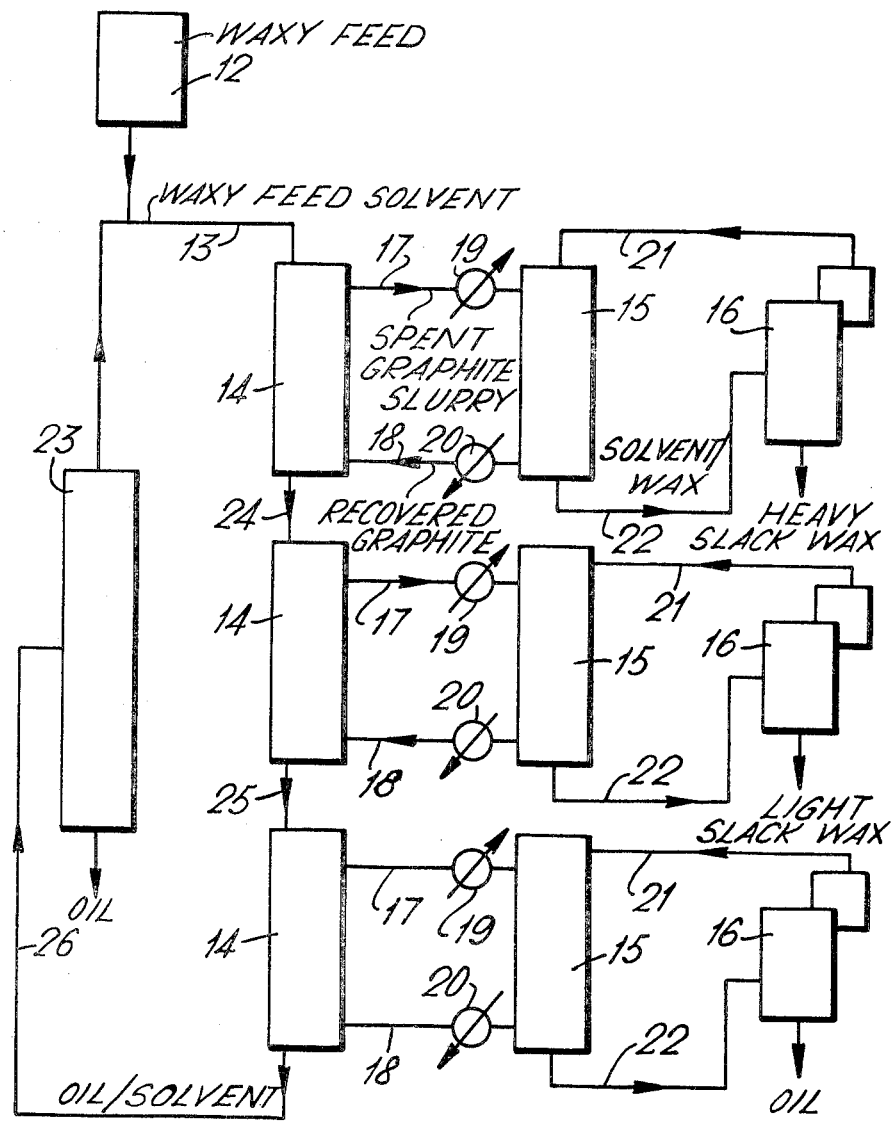
Figure 3:
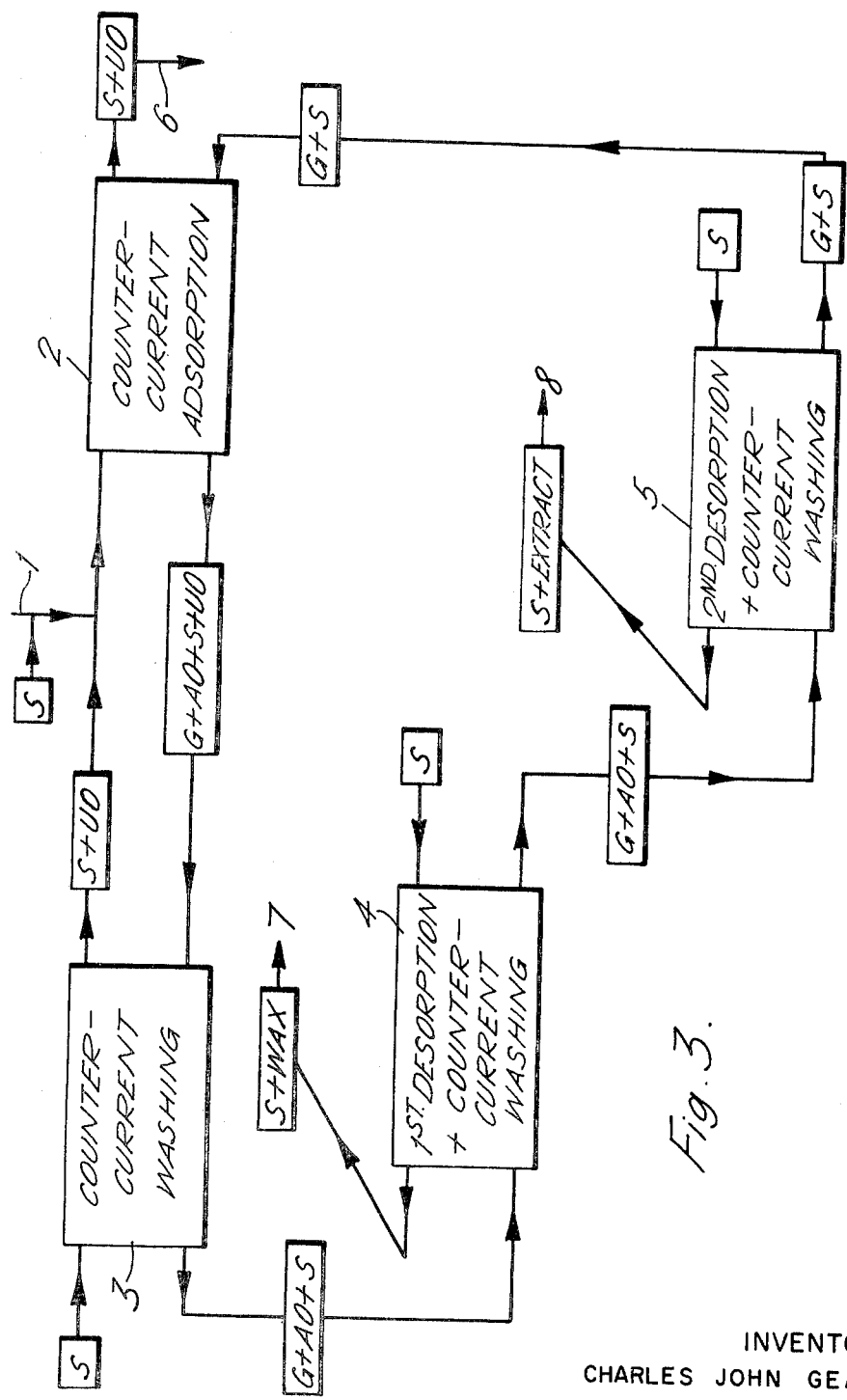

FIGS. 1 and 2 illustrate a single-stage and a three-stage process slurry process respectively, and FIG. 3 illustrates a multi-stage counter-current flow process.

By the process of FIG. 1 long chain n-paraffins may be obtained from a waxy raffinate feed, and by the process of FIG. 2 thre paraffin hydrocarbon products may be obtained from such a feed. In the following discussion of both the single-stage and three-stage processes the feed mixture will be termed a "waxy feed" and the hydrocarbon liquids used in adsorption and desorption will be termed "solvent." The hydrocarbons desorbed from the graphite will be described as "wax."

In FIG. 1 waxy feed is supplied via line 1 and solvent is supplied via line 2 to a graphite treatment vessel 5 in which graphite, the waxy feed and solvent are slurried together. The solvent/unadsorbed material is supplied via line 4 to recovery column 3, from which the solvent leaves via line 2. Spent graphite vessel 5 via line 6 to a graphite regeneration vessel 7 in which the graphite having wax adsorbed on it is slurried with solvent. Solvent containing wax desorbed from the graphite passes via line 10 to a second solvent recovery column 11. The recovered solvent is returned from column 11 via line 9 to vessel 7, while the recovered wax (slack wax) is removed from 11 as a product. Regenerated graphite is supplied from the graphite to regeneration vessel 7 via line 8 to the graphite treatment vessel 5.

In FIG. 2 waxy feed is supplied from feed vessel 12 via line 13 and mixed with solvent from a solvent recovery column 23. The feed/solvent mixture is supplied to the first of three units joined in series and passes in turn to the second and third units via lines 24 and 25 respectively. Each unit consists of an adsorption vessel 14, a recovery vessel 15, and a solvent recovery column 16. A slurry of graphite containing adsorbed wax passes via line 17 and heater 19 from vessel 14 to vessel 15 and recovered graphite is returned via line 18 and heater 20. Solvent and desorbed wax leaves vessel 15 via line 22 to solvent recovery column 16, from where solvent returns via line 21 to vessel 15. Heavy slack wax may be recovered from the first solvent recovery column 16, light slack wax from the second solvent recovery column 16, and de-waxed oil from the third solvent recovery column 16. From the third adsorption vessel 14, oil and solvent pass via line 26 to solvent recovery column 23, from where a second dewaxed oil cut may be obtained. Thus, for example, using the process of FIG. 2 on a 160/95 waxy raffinate feed, with iso-octane as the solvent, an oil having a $+35°$ F. pour point and a viscosity index of 118 may be obtained from column 16, while a $-30°$ F. pour point, 95 viscosity index oil may be obtained from column 23, using adsorption and desorption temperatures of 20° C. and 300° C. respectively.

In the process shown in FIG. 3 the letters G, S, UO and AO refer to graphite, solvent, unadsorbed oil and adsorbed oil respectively. In this process, for example, waxy distillate feed may be supplied via line 1 and mixed with solvent. It may be contacted with graphite in vessel 2 as a slurry with solvent under ambient conditions. Washing occurs in vessel 3 also under ambient conditions. Desorption takes place in vessel 4 at a temperature of, for example, 121° C. and a pressure of 100 p.s.i.g., and in vessel 5 at a temperature of 300° C. and a pressure of 100 p.s.i.g. Solvent passes to recovery and recirculation via lines 6, 7, and 8. In this process a finished lubricating oil base-stock, a slack wax and an aromatic extract may be produced.

Desorption efficiency increases with temperature, and the use of an elevated desorption temperature enables more rapid desorption of strongly adsorbed normal paraffins and aromatic hydrocarbons than at lower temperatures with corresponding economy in the amount of solvent used. We have found in a cyclic process that the solvent/feed weight ratio per cycle may be as low as 7:1 when using a desorption temperature near the upper limit of the range specified, compared to 25:1 with a desorption temperature of 80° C. After cooling the graphite to adsorption temperature it may be charged again and the adsorption-desorption cycle repeated.

In the case of preparation of lubricating oil basestocks, the feedstock may be treated by any number of adsorption/desorption cycles to give the desired pour-point and viscosity index. The pour-point of the treated material will decrease as the extent of removal of adsorbed materials increases, but the yield will also decrease. Fractions treated by the processes of the invention have in general higher viscosity indexes, lower cloud and pour points and lower sulphur contents than fractions obtained by conventionally treating similar feedstocks. They also have higher resistance to oxygen attack. In addition to the oil products obtained, the adsorbed and subsequently desorbed material, i.e. normal paraffins and/or aromatic materials may be of use, particularly if it is waxy paraffinic or aromatic hydrocarbon material.

The invention is illustrated by the following examples.

EXAMPLE 1

This example refers to the preparation of a graphite suitable for the process of the invention.

A graphite was ground in a vibratory mill having a tube of capacity 570 mils. 30 gms. of the graphite was placed in the tube, 80% of the remaining volume of which was filled with $5/16$ in. diameter steel balls. The tube was evacuated to a pressure of 1 mm. of mercury, and the vibration amplitude and frequency were set at 4 mm. and 2800 cycles/sec. respectively. Under these conditions a graphite of surface area 415 m.$^2$/gm. was obtained in 60 mins.

EXAMPLE 2

A 160/95 waxy raffinate derived from a Kuwait/Imeg crude was treated by a process of the invention using 6 cycles of adsorption/desorption.

Batch treatments with graphite having a surface area of 500 m.$^2$/gm. were used. The graphite was prepared by grinding a synthetic graphite under vacuum in a vibratory ball mill for 2 hours. The solvent for both adsorption and desorption was iso-octane and data were obtained by shaking 100 parts by weight of graphite with 25 parts by weight of waxy raffinate for 10 minutes at 22° C. The resulting slurry was filtered and the solvent stripped off.

The following Table 1 shows the properties of the unadsorbed products obtained (O) and the adsorbed portions (N) at successive cycles of treatment.

TABLE 1

| Cycle No. | Oil to graphite ratio, wt./wt. | Yield, percent wt. in Raffinate | | Viscosity, cst. | | | | Viscosity index | | Sulphur, percent wt. | | Pour point, ° F. | |
|---|---|---|---|---|---|---|---|---|---|---|---|---|---|
| | | | | 100° F. | | 210° F. | | | | | | | |
| | | O | W | O | W | O | W | O | W | O | W | O | W |
| 1 | 1:1 | 76.5 | 23.5 | | | | | | | 0.76 | | 75 | |
| 2 | 1:1 | 61.5 | 15.0 | 93.39 | | 10.40 | | 102 | | 0.64 | | 45 | |
| 3 | 1:1 | 51.3 | 10.2 | 100.0 | | 10.69 | | 98 | | 0.53 | 0.95 | 10 | 90 |
| 4 | 1:1 | 43.0 | 8.3 | 105.0 | 68.85 | 10.89 | 9.27 | 96 | 118 | 0.47 | 0.47 | −15 | 35 |
| 5 | 1:2 | 29.6 | 13.4 | 113.4 | 85.83 | 11.11 | 10.11 | 90 | 107 | 0.34 | 0.54 | −30 | 25 |
| 6 | 1:4 | 12.9 | 16.7 | 114.2 | 107.20 | 10.9 | 11.0 | 85 | 95 | 0.27 | 0.42 | −60 | −10 |

EXAMPLE 3

The following Table 2 shows the results obtained by treatment of a 150/75 fraction derived from a Middle East crude under the conditions shown.

The material shown under run 3 of Table 2 was one of the 4 cuts obtained by distillation of a Kuwait waxy distillate (cuts A to D), followed by furfural extraction. Cut C is one of the cuts from which 150/75 lubricating oil base stock is derived, and in this case cut C was treated with 333% wt. graphite at 100° C. The values given are mean properties of 4 different eluted fractions.

Runs 4a and 4b are the first and second eluates obtained by treatment of the material of run 3 with the first 500 mls. of iso-octane and the second 500 mls. of iso-octane respectively. The values given were determined after solvent stripping.

It will be seen that reduction in aromatic content has occurred (as indicated by increase in the viscosity index (VI) without appreciable reduction in paraffinic content (as indicated by the small reductions in pour point).

TABLE 2

| No. | Oil | Pour point, °F. | Viscosity, cst. 100° F. | Viscosity, cst. 210° F. | VI |
|---|---|---|---|---|---|
| 1 | 150/75 fraction | 15 | 105.2 | 9.95 | 77 |
| 2 | As 1 above, treated at 100° C. with 300% wt. graphite in iso-octane (80% yield, based on 1). | 5 | 81.68 | 8.93 | 90 |
| 3 | Graphite Raffinate ex cut C, Kuwait waxy distillate, (50% yield based on the feed). | 0 | 75.47 | 8.29 | 84 |
| 4 | As 3 above, treated with 300% wt. graphite at 50° C. in iso-octane. | | | | |
| 4a | Fraction 1 (44% wt. based on 3) | 0 | 52.97 | 7.05 | 99 |
| 4b | Fraction 2 (40% wt. based on 3) | +5 | 66.00 | 7.83 | 90 |

EXAMPLE 4

Table 3 below shows results obtained by treatment of a 160/95 waxy reaffinate, derived from a Kuwait/Imeg crude using as the solvent the mixtures of butyl alcohols and toluene shown. Other process conditions were as described in Example 2.

TABLE 3

| Solvent | Yield of oil, percent wt. on feedstock | Pour point of oil |
|---|---|---|
| Toluene | 59.2 | 25 |
| 10% tert-butanol in toluene | 52.5 | 5 |
| 50% tert-butanol in toluene | 42.0 | −35 |
| 80% tert-butanol in toluene | 33.8 | −30 |
| Tert-butanol | 21.7 | −35 |
| 50% sec.-butanol in toluene | 38.0 | −20 |
| Sec.-butanol | 26.9 | −60 |

The low pour-points obtained should be noted.

EXAMPLE 5

This example describes cyclic processes using the same solvent for both adsorption and desorption, as indicated.

The graphite was in the form of a fixed bed as a 50% by volume mixture with a filter aid. Solvent flow through the bed at a rate of 500 ml./hr. produced a pressure drop not exceeding 20 p.s.i.

160/95 waxy raffinate and 65/100 waxy raffinate were separately treated. Conditions for treatment of the former were as follows:

Adsorbent column—30 ins. height, 1½ ins. diameter
Volume of column—700 ml.
Solvent flow rate—1500–3700 mls./hr./1000 gms. graphite
Adsorbent weight—134 gms.
Weight of filter aid—69 gms.
Adsorption temperature—25° C.

Desorption temperature:
(a) iso-octane ⎫
(b) PFD ⎬ 200–225° C.
(c) n-butane, 155° C.
Feed charged per cycle—33.5 gms.

The 65/100 waxy raffinate was treated under the following conditions:

Adsorbent column—24 ins. height, 3 ins. diameter
Solvent flow rate—500 mls./hr./1000 gms. graphite
Adsorbent weight—1000 gms.
Weight of filter aid—515 gms.
Adsorption temperature—25° C.
Desorption temperature—150° C.
Feed charged per cycle—150 gms.

The progress of adsorption and desorption was followed by using a flow micro-calorimeter into which samples of eluate from the column were injected at regular intervals. Detection of oil in the eluant was made by determining the heat of preferential absorption of oil on molybdenum disulphide in the calorimetric cell.

In the case of the treatment with iso-octane of the 160/95 waxy raffiniate, approximately 70% of the feedstock was eluted by the first 500 mls. of solvent, elution being virtually completed after percolation of 1250 mls. of solvent: the residual 30% of the feedstock not eluted in the first 500 mls. of solvent, however, had a high pour point (70° F. to 80° F.). The adsorbed materials were rapidly displaced at 200–225° C., nearly all the wax and A+S compounds being removed by 500 mls. of iso-octane. After cooling the graphite bed to ambient temperature it was charged again and the adsorption/desorption cycle repeated.

50% of the 65/100 waxy raffinate was eluted by the first 1500 mls. of the solvent. Thus, the amount of solvent required to desorb from 40 to 60% of both the 65/100 and the 160/95 feedstocks was from 10 to 15 times that of the eluted oil, as will be seen from the data.

Table 4 below shows results obtained from 160/95 waxy raffinate and Table 5 below shows results using 65/100 waxy raffinate.

TABLE 4

| Solvent | Volume of Solvent Used in Adsorption, ml./100 g. Graphite | Yield of Oil Percent on Feed | Yield of Oil G./100 g. Graphite | Pour Point, °F. | Colour ASTM No. D 1500 | Sulphur, percent wt. | Viscosity cst. 100° F. | Viscosity cst. 210° F. | Viscosity Index |
|---|---|---|---|---|---|---|---|---|---|
| Iso-octane | 360 | 57 | 14.2 | 20 | <0.5 | 0.5 | 92.95 | 10.21 | 99 |
| Do | 190 | 60 | 15.0 | 10 | <0.5 | 0.43 | 98.39 | 10.55 | 98 |
| PFD | 180 | 42 | 10.5 | 15 | <0.5 | 0.80 | 94.96 | 10.43 | 100 |
| n-Butane | 160 | 62 | 15.5 | 15 | <0.5 | 0.42 | 87.54 | 9.99 | 102 |
| Do | 160 | | | 10 | <0.5 | | 92.5 | 10.9 | 110 |

TABLE 5

| Volume of Solvent Used in Desorption, ml./100 g. Graphite | Yield of Oil Percent on Feed | Yield of Oil G./100 g. Graphite | Pour Point, °F. | Colour ASTM No. D 1500 | Sulphur, Percent Weight | Viscosity, cst. 100° F. | Viscosity, cst. 210° F. | Viscosity Index |
|---|---|---|---|---|---|---|---|---|
| 130 | 41 | 6.1 | −5 | 0.5 | 0.40 | 27.91 | 4.73 | 95 |
| 150 | 50 | 7.5 | +10 | 0.5 | 0.50 | 28.28 | 4.84 | 102 |
| 150 | 30 | 3.0 | +45 | 0.5 | 0.74 | 26.16 | 4.71 | 110 |

What we claim is:
1. A process for the separation of aromatic and n-paraffin hydrocarbons from a petroleum fraction in which a petroleum fraction containing aromatic hydrocarbons and normal paraffin hydrocarbons having at least 4 carbon atoms per molecule is mixed with a liquid in which the aromatic and normal paraffin hydrocarbons are soluble, the mixture is contacted with a slurry of an adsorbent consisting essentially of a graphite having a surface area of at least 50 m.²/gm. in the said liquid at a temperature of from −50 to 200° C., the slurry is washed with further liquid at a temperature of from −50 to 200° C., and at substantially the same temperature as that at which the mixture is contacted with the slurry, so as to separate unadsorbed material from the graphite, and the adsorbed components are desorbed from the graphite in two stages by contacting the slurry thereof in the liquid with further liquid, the first desorption being carried out at a temperature of from +20 to 270° C. and the second desorption being carried out at a higher temperature than that of the first desorption and from 100 to 400° C.

2. A process as claimed in claim 1 being a continuous counter-current flow slurry process in which assisted settling of the slurry is used.

3. A process as claimed in claim 2 in which the liquid to graphite ratio is at least 1:1 wt./wt., the ratio of liquid overflow to liquid underflow from the vessel in which the slurry is contacted with the mixture is greater than 1:1 wt./wt. and the liquid to graphite ratio in the underflow is a minimum.

4. A process as claimed in claim 3, in which the overflow:underflow ratio is greater than 1.5:1.

5. A process as claimed in claim 1, in which the petroleum fraction mixed with the liquid is a petroleum fraction boiling above 30° C.

6. A process as claimed in claim 5, in which the petroleum fraction boiling above 30° C. is a waxy distillate boiling in the range 300–700° C.

7. A process as claimed in claim 1, in which the petroleum fraction mixed with the liquid is a waxy raffinate obtained from a waxy distillate boiling in the range 300–700° C. by a selective solvent treatment to remove aromatics.

8. A process as claimed in claim 1 in which the graphite has a surface area of from 300–1200 m.$^2$/gm.

9. A process as claimed in claim 8 in which the graphite is obtained by grinding in an organic liquid having a boiling point below 500° C., a viscosity below 600 centistokes at 38° C. and a surface tension below 72 dynes/cm.

10. A process as claimed in claim 1 in which the liquid used in adsorption is the same as that used in desorption.

11. A process as claimed in claim 1 in which the liquid used in adsorption is different to that used in desorption.

12. A process as claimed in claim 1 in which the liquids used in adsorption and desorption have a maximum boiling point not greater than 100° C. and are selected from single paraffin hydrocarbons, single aromatic hydrocarbons, alcohols, ketones, refinery streams and mixtures of any of the foregoing.

13. A process as claimed in claim 12 in which the liquids are selected from n-heptene, iso-octane, benzene, toluene, P.F.D., $C_4$–100° C. straight run gasoline, liquid propane and liquid butane.

14. A process as claimed in claim 1 in which operating conditions are selected from the following ranges:
Adsorption:
 Contacting time 1 min.–24 hrs.
 Liquid:feed ratio, 5:1–100:1
 Additional liquid wash:feed ratio, 1:1–100:1
 Pressure, 0.1–1000 p.s.i.a.
 Graphite:feed ratio, 0.25:1–100:1
Desorption:
 Contacting time, 1 min.–24 hrs.
 Liquid:desorbate ratio, 5:1–100:1
 Graphite ratio, 0.25:1–100:1
 Pressure, 10–10,000 p.s.i.a.
 Overall liquid:feed ratio, 5:1–100:1.

15. A process as claimed in claim 14, in which operating conditions are selected from the following ranges:
Adsorption:
 Contacting time, 2 mins.–30 mins.
 Liquid:feed ratio, 5:1–20:1
 Additional liquid wash:feed ratio, 2:1–5:1
 Graphite:feed ratio, 1:1–5:1
 Pressure, 10–200 p.s.i.a.
 Temperature, 0–40° C.
Desorption:
 Contacting time, 2 mins.–30 mins.
 Liquid:desorbate ratio, 5:1–20:1
 Graphite:desorbate ratio, 0.5:1–5:1
 Pressure, 10–1000 p.s.i.a.
 Temperature, 100–400° C.
 Overall liquid:feed ratio, 5:1–20:1.

16. A process as claimed in claim 1 in which desorption conditions are selected from the following ranges:
1st desorption:
 Pressure, 10–10,000 p.s.i.a.
 Liquid:desorbate ratio, 5:1–100:1
 Contacting time, 1 min.–24 hrs.
 Graphite:desorbate ratio, 0.25:1–100:1
2nd desorption:
 Pressure, 10–10,000 p.s.i.a.
 Liquid:desorbate ratio, 5:1–100:1
 Contacting time, 1 min.–24 hrs.
 Graphite:desorbate ratio, 0.25:1–100:1.

17. A process as claimed in claim 16, in which desorption conditions are selected from the following ranges:
1st desorption:
 Temperature, 40–125° C.
 Pressure, 10–1000 p.s.i.a.
 Liquid:desorbate ratio, 5:1–20:1
 Contacting time, 2 mins.–30 mins.
 Graphite:desorbate ratio, 0.5:1–5:1
2nd desorption:
 Temperature, 150–400° C.
 Pressure, 10–1000 p.s.i.a.
 Liquid:desorbate ratio 5:1–20:1
 Contacting time, 2 mins.–30 mins.
 Graphite:desorbate ratio, 0.5:1–5:1

References Cited

UNITED STATES PATENTS

| | | | |
|---|---|---|---|
| 2,585,492 | 2/1952 | Olsen | 260—676 |
| 2,754,343 | 7/1956 | Maisel | 260—676 |
| 3,338,815 | 8/1967 | Groszek | 208—310 |

HERBERT LEVINE Primary Examiner

U.S. Cl. X.R.

208—26, 28; 260—674, 676

PO-1050
(5/69)

BP-869
(P.2075)

UNITED STATES PATENT OFFICE
CERTIFICATE OF CORRECTION

Patent No. 3,513,089  Dated May 19, 1970

Inventor(s) John Charles Geach and Aleksander Jerzy Groszek

It is certified that error appears in the above-identified patent and that said Letters Patent are hereby corrected as shown below:

Col. 3, line 30 for "hydrocarbon" read --hydrocarbons--;

Col. 3, line 40 for "the" read --this--;

Col. 3, lines 67-68 for "liquid flowrate 0.1-5.0 litres/hr/ preferably 0.1-1 litres/hr/1000 gms graphite - 1000 gms graphite" read --liquid flowrate 0.1-5.0 litres/hr/1000 gms graphite - preferably 0.1-1 litres/hr/1000 gms graphite--;

Col. 4, line 11 for "temperatures" read --temperature--;

Col. 4, lines 16 and 17 for "preferably min. - 30 min." read --preferably 2 mins. - 30 mins.--;

Col. 4, lines 26-27 for "preferably 2 min. - 30 min." read --preferably 2 mins. - 30 mins.--;

Col. 4, line 37 for "casee" read --case--;

Col. 4, line 52 for "four-point" read --pour-point--;

Col. 4, line 61 for "desorbed material" read --bed, stripping liquid from the desorbed material--;

Col. 4, line 71 for "thre" read --three--;

Col. 5, line 8 for "graphite vessel 5" read --graphite leaves vessel 5--;

Col. 7, line 23 for "reaffinate" read --raffinate--;

Col. 10, line 4 for "Graphite ratio" read --Graphite:desorbate ratio--.

SIGNED AND
SEALED
OCT 13 1970

(SEAL)
Attest:

Edward M. Fletcher, Jr.
Attesting Officer

WILLIAM E. SCHUYLER, JR
Commissioner of Patents